Jan. 20, 1959 E. LUDWIG 2,870,390
CONTROL SYSTEM FOR REGULATION OF DIRECT CURRENT MACHINES
WITH RECTIFIERS IN ARMATURE AND EXCITER CIRCUITS
Filed May 3, 1955 5 Sheets-Sheet 1
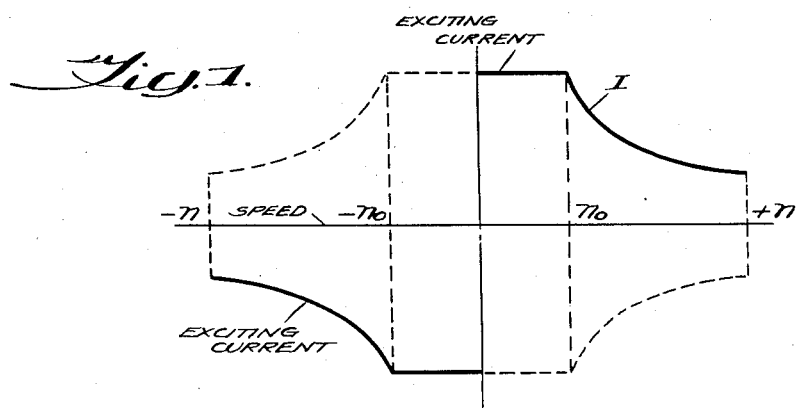
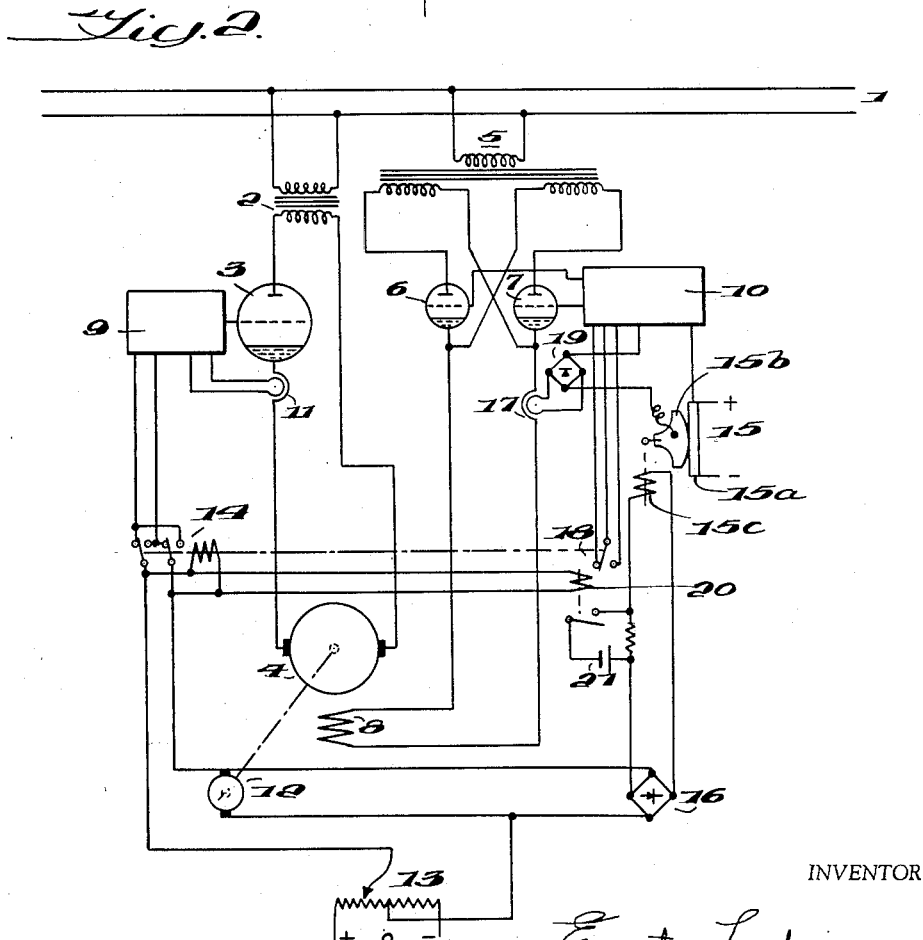
INVENTOR
Ernst Ludwig
BY Pierce, Scheffler & Parker
ATTORNEYS

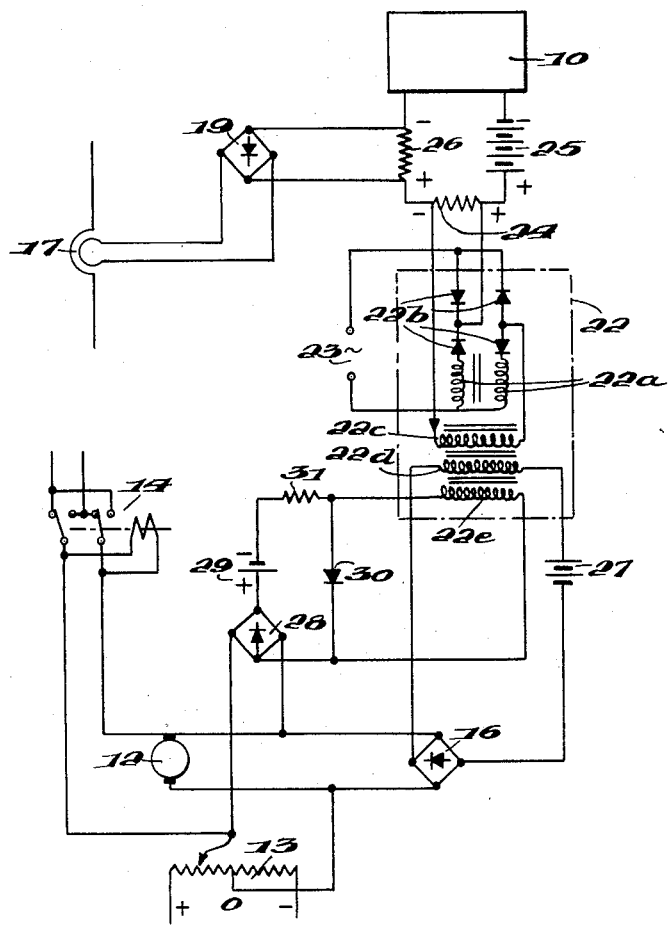

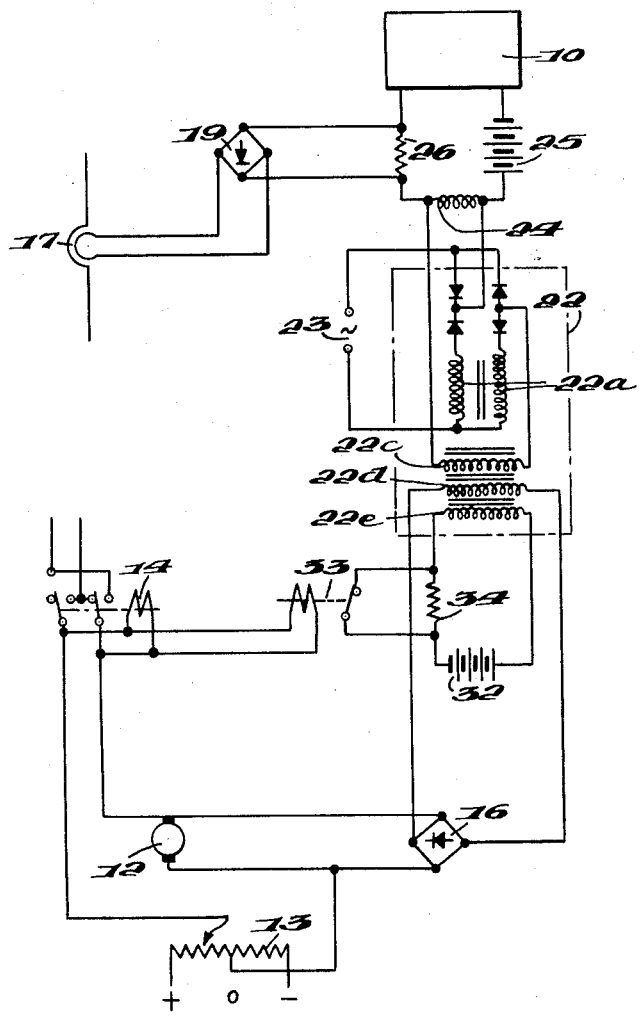

Jan. 20, 1959 E. LUDWIG 2,870,390
CONTROL SYSTEM FOR REGULATION OF DIRECT CURRENT MACHINES
WITH RECTIFIERS IN ARMATURE AND EXCITER CIRCUITS
Filed May 3, 1955 5 Sheets-Sheet 4
Fig. 5
Fig. 6
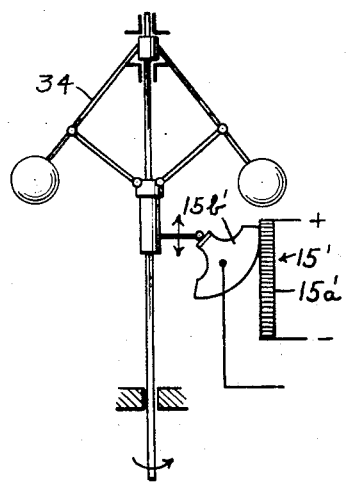
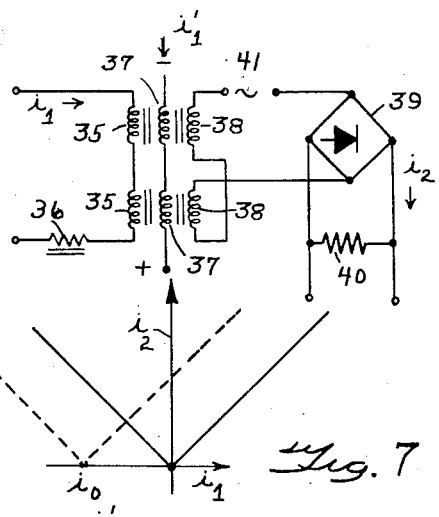
Fig. 7
$—\ i'_1 = 0$
$---\ i'_1 = i_0$
Fig. 8
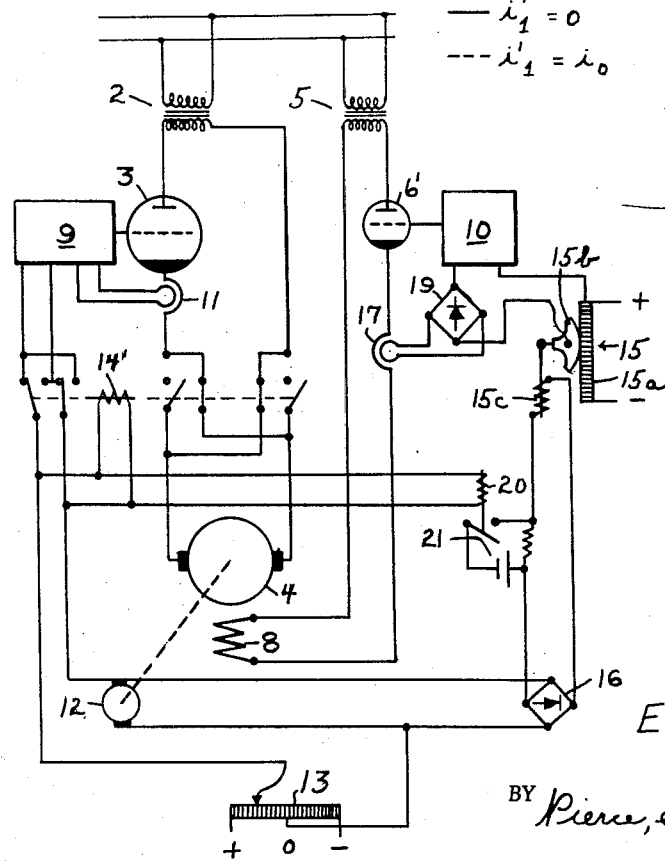
INVENTOR
Ernst Ludwig
BY Pierce, Scheffler & Parker
ATTORNEYS INVENTOR
Ernst Ludwig
BY Pierce, Scheffler & Parker
ATTORNEYS United States Patent Office 2,870,390
Patented Jan. 20, 1959

2,870,390

CONTROL SYSTEM FOR REGULATION OF DIRECT CURRENT MACHINES WITH RECTIFIERS IN ARMATURE AND EXCITER CIRCUITS

Ernst Ludwig, Mannheim-Lindenhof, Germany, assignor to Brown, Boveri & Cie, Aktiengesellschaft, Mannheim, Germany, a joint-stock company Application May 3, 1955, Serial No. 505,805

Claims priority, application Germany May 8, 1954

11 Claims. (Cl. 318—327)

The present invention relates to systems for controlling the speed of dynamo electric machines and in particular to such systems wherein the armature and field circuits of the machine are supplied respectively with currents controlled by rectifiers, the latter being of the grid control type and wherein the grid circuits of the rectifiers are controlled in accordance with the instantaneous difference between reference voltages and voltages which vary in proportion to actual machine speed and exciter current.

A principal object of the invention is to provide an improved arrangement wherein the amplitude of the reference voltage for control of the exciter current does not remain constant but rather is reduced in accordance with increases in machine speed as soon as the speed has exceeded a certain basic value.

There are a number of methods for feeding a direct current dynamo-electric machine by rectifiers. One method uses for the feeding of the armature of the direct current machine as well as for the feeding of the exciting field one or more rectifiers of the grid controlled type. As a rule, both the armature and the field rectifiers are provided with regulators which operate on the respective grid control devices, these regulators having the function of maintaining the direct current machine at a speed of rotation which is established by a reference quantity such as a voltage, the amplitude of which is adjustable and representative of the machine speed desired to be maintained. The regulators can cooperate, for example, in such a way that, starting from the machine at standstill, at constant maximum exciting current first the armature voltage is brought from zero to a maximum determined by the design of the machine by actuation of the grid control apparatus of the armature rectifier. The speed of rotation which establishes itself at full exciting current and maximum armature voltage is called the basic speed. If the speed is to be increased, this can be done only by reducing the exciting current. This means that the work of the regulator for the armature rectifier is relieved by the work of the regulator for the field rectifier. The frictionless relief of the armature regulator by the field regulator, without interruption of energy supply in the direct current machine, has heretofore been accomplished in little satisfactory manner. Thus there are methods which set the magnitude of the required exciting current rigidly, dependent only on the position of the reference value setting means i. e. the amplitude of the reference voltage. But since during speed variations the speed of rotation of the motor does not follow the adjustment of the reference voltage without inertia, additional relay devices are required which allow the adjustment of the exciting current commanded by the position of the reference voltage determining means to become operative only when the direct current machine has reached its basic speed.

Another known arrangement operates by controlling the regulators for the rectifiers which supply the exciter current and armature currents to the machine by the difference between the reference voltage and a voltage proportional to actual machine speed, small differences influencing only the regulator for the armature current, while big differences influence also the regulator for the exciting current. This method also requires additional devices, because in case of a sudden change in the amplitude of the reference voltage in the sense of a speed increase, care must be taken that, despite the initially large difference between the reference voltage and the voltage variable with machine speed, at first only the regulator for the armature current and then only the regulator for the exciting current operates, or that for a speed decrease the reverse order is followed.

In drives of the kind mentioned, each speed of rotation of the machine to be regulated has unambiguously correlated with it a corresponding value of the exciting current. In Fig. 1 the required course of the exciting current I is shown as a function of the speed of rotation $n$, the possibility of left-hand and right-hand rotation of the machine being presupposed. Within the basic speed range the exciting current is constant and also has its maximum value. Above the basic speed $n_0$ the exciting current I is to be decreased along a hyperbolic curve at constant armature voltage although the course of the curve may be different for each machine. The curves of Fig. 1 in solid lines show the required course of the exciting current I in the state of normal operation of the motor, while the portion shown in dotted lines enters into consideration for electric braking.

Underlying the invention is the problem of achieving such a modification of the exciting current dependent on the actual speed of rotation of the machine in the required sequence for the variation of the armature current according to Fig. 1, in order to eliminate the mentioned difficulties, or of limiting the exciting current to corresponding values.

The arrangement more fully described in the following according to the invention and serving this purpose, can analogously be used also for making the regulation or limitation of the armature current dependent on the actual speed of rotation. By this means, for example, the armature current can be limited in any desired manner to lower values at high motor speeds than at low speeds. Such a measure may be useful for eliminating commutating difficulties which may occur at high armature current and high speed of rotation.

The invention provides an arrangement where for the regulation of direct current machines, preferably for reversing drives with rectifiers in the armature as well as the exciter circuits and with control of the rectifier or rectifiers in the exciter circuit and possibly also in the armature circuit by a regulation based on comparison between reference and actual values, the reference value or voltage for establishing the desired amplitude of exciter current does not remain constant but rather is caused to change in accordance with the change in speed of the machine, the change in said reference voltage being according to a selectable function, in particular decreasing along a hyperbolic function above the basic speed.

With reference now to the accompanying drawings, Fig. 1, as already indicated, is a graph plotting variation in exciting (field) current with motor speed in each direction of rotation of the motor armature;

Fig. 2 is a schematic circuit diagram illustrating one embodiment of the invention;

Fig. 3 is also a circuit diagram showing a modified construction for a portion of the system of control illustrated in Fig. 2;

Fig. 4 is a view similar to Fig. 3 showing a modification thereof;

Fig. 5 is a fragmentary view showing a modification for actuating the roller sector of the potentiometer element shown in the Fig. 2 circuit.

Fig. 6 is a partial schematic diagram showing a magnetic amplifier for interposing an additional control voltage in the energizing circuit of the roller sector type potentiometer shown in Fig. 2.

Fig. 7 are curves which show the relationship between input and output currents in the Fig. 6 magnetic amplifier.

Figure 9:
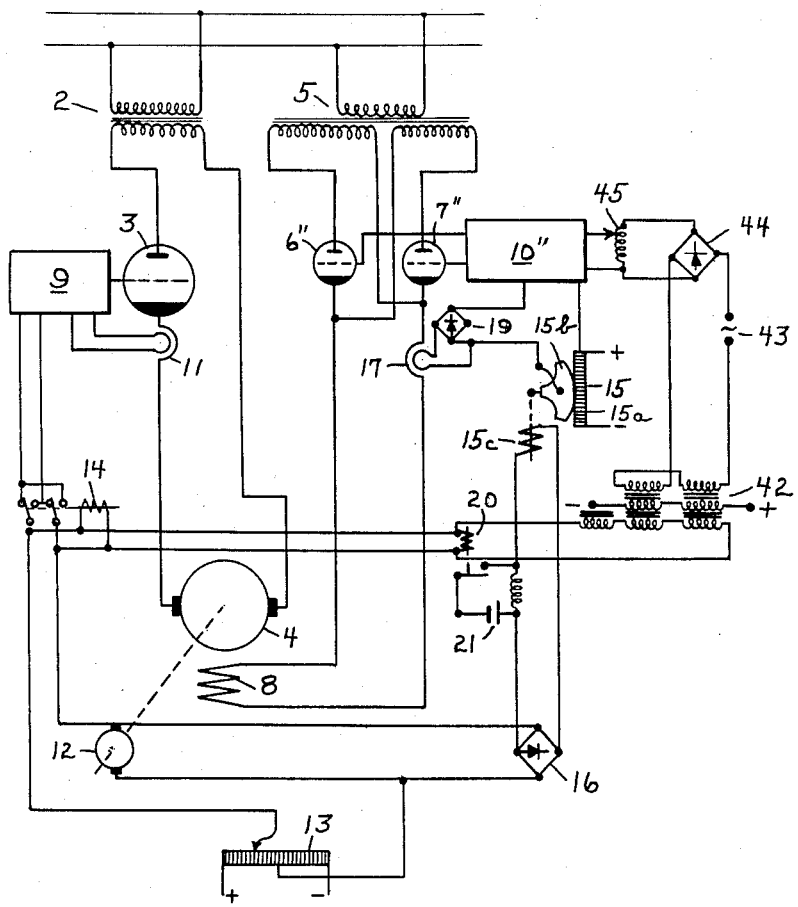

Fig. 8 is a schematic diagram of a control system similar to that shown in Fig. 2 but wherein the direction of the exciter current through the motor field is fixed and the armature current is reversed by a reversing switch; and Fig. 9 is a schematic diagram showing a modification of that part of the Fig. 2 circuit relating to the switch-over from rectifier 6 to rectifier 7, or vice versa in the motor field control circuit.

With reference now to the circuit diagram of Fig. 2 it will be seen that from the alternating current mains 1 the armature 4 of the motor is fed through the transformer 2 and rectifier 3. The rectifiers 6 and 7 connected to the transformer 5 supply the current for the exciter winding 8 of the motor. The grids of rectifier 3 are controlled by the control device 9 and those of rectifiers 6 and 7 by the control device 10. For the limitation of the armature current, the armature circuit includes a device 11 of known construction which measures the amplitude of the armature current and transmits a control voltage proportional thereto to the control device 9 which serves to place a limit on the current through rectifier 3.

The actual value of the motor speed is measured by a tachometer dynamo 12 which is driven by the motor armature 4. The output voltage of tachometer dynamo 12 which thus is proportional to motor speed is connected in opposition to a reference voltage constituted by the output from a potentiometer 13 which serves as a speed setting means. The difference between the reference voltage at potentiometer 9 and the tachometer voltage is applied to the control device 9 for the armature circuit 3. A polarized reversing relay 14 connected to the voltage corresponding to the difference voltage establishes the direction of regulation corresponding to the direction of rotation selected at the potentiometer 13.

As indicated, an object of the present invention is to adjust the reference voltage for controlling the exciter current in accordance with the speed of the motor such that it will have a characteristic as shown in Fig. 1, the exciter current remaining constant throughout the basic speed range but decreasing at speeds exceeding the basic speed. To this end, the voltage from tachometer 12 is fed to rectifier 16 and the output from rectifier 16 is applied to the control winding 15c of a roller sector type potentiometer 15. A direct voltage is applied to the terminal ends of the resistor 15a and as the roller sector 15b rolls over the resistor 15a by virtue of the current applied to control winding 15c, a correspondingly varied reference voltage is produced. The reference voltage produced at potentiometer 15 is connected in opposition to an alternating voltage proportional to the actual exciter current. The latter voltage is obtained by a current measuring device of known construction 17 similar to device 11, and is applied to the input of a rectifier unit 19, the output voltage of rectifier 19 being compared with the output voltage of potentiometer 15 and the difference voltage applied to the control device 10 which in turn regulates the current through rectifiers 6 and 7 in the exciter circuit. The control is such that the difference voltage is kept at a minimum thus setting the exciter current at a value corresponding to the reference voltage obtained at potentiometer 15.

The polarized relay 14 includes a set of contacts 18 arranged in the control device 10 and which renders rectifier 6 or rectifier 7 conductive in order that the current in exciter winding 8 will flow in the proper direction corresponding to the sense of the difference between the reference voltage at potentiometer 13 and the motor speed voltage at tachometer generator 12.

The rolling sector 15b is provided with a spring which strives to pull it into the lowest position at which the voltage connected to the resistance 15a is fully connected. The regulating device thereby adjusts the maximum exciting current.

As soon as the motor speed, or respectively the voltage of the tachometer dynamo, has reached a certain value, the actuating coil 15c starts to rotate the rolling sector 15b out of its position. As the speed of rotation continues to increase, the voltage tapped from the rolling sector 15b is thereby reduced and hence the adjustment of a correspondingly lower exciting current is set for the regulating device 10. By suitable gradation of the resistance 15a, any desired dependence of the exciting current on the motor speed, for instance one according to Fig. 1, can be obtained. The speed at which the rolling sector regulator 15 begins to operate should advantageously correspond as accurately as possible to the basic speed of the motor. However, since the basic speed is not a perfectly constant magnitude, but depends on the load and also on the voltage fluctuations in the supply mains 1, it is advisable to adjust the regulator 15 so that the rolling sector leaves the end position at a motor speed which is somewhat below the normal basic speed, for example at 90 or 95% thereof.

Otherwise it may happen that at full excitation the motor does not reach the speed at which the regulator 15 responds and hence a regulation set to a speed in the range of the field weakening "sticks."

The operation of the described device together with the regulation of the armature current is as follows:

If a certain speed of rotation in the field weakening range is adjusted at the speed setting potentiometer 13 while the main motor stands still, the tachometer dynamo 12 will at first yield no voltage, so that the difference between reference and motor speed voltages corresponds to the tapped voltage at the potentiometer 13. It displaces the grid control device 9 of the armature rectifier in a sense such that a voltage is impressed on the motor armature and an armature current flows. The current limiting device prevents this armature current from assuming a value incompatible with the machine or the rectifier. The motor starts to rotate and the tachometer dynamo furnishes the voltage through which with increasing speed the difference between the reference and motor speed voltages is reduced.

At the same time the voltage of the tachometer dynamo operates through the rectifying cell 16 on the actuating coil 15c of the rolling regulator, which by the built-in spring is still held in its lower end position. Since—as has been said—the spring of the rolling sector 15b is so adjusted that a movement from the end position begins at an armature speed or armature voltage of about 90 or 95% of the full voltage of the armature rectifier, whereas the difference between reference and actual speed voltages is still large (when, as assumed, a speed of rotation in the field weakening range is adjusted at the speed setting means), the armature voltage at the motor will be increased to its full value and will effect a further acceleration of the motor armature.

The increasing speed of rotation, in turn, causes the rolling sector 15b of the potentiometer 15 to start to move toward the upper stop and to reduce the reference voltage for the exciting current itself according to the curve of Fig. 1.

If the speed of the motor approaches the value adjusted at the speed setting potentiometer 13, the difference between reference and motor speed voltages for the armature current regulation is then reduced and the armature voltage decreased until no further acceleration takes place. The drive has thus reached the speed commanded it.

If a speed of rotation in the field weakening range is now adjusted at the speed setting potentiometer 13, but in the opposite direction of rotation, the consequence of this is that by the polarized relay 14 the rectifiers 6 and 7 for the exciting current are controlled in the sense of a reversal of the exciting current and that also the direction of regulation of the armature current is reversed. The reference voltage for the exciting current will at first remain unchanged, as the speed of the motor and hence the position of the rolling sector 15b is at first the same.

By displacement of the speed setting potentiometer 13 to the opposite direction of rotation the motor is braked in known manner by conversion of the rectifier for the armature current to inverted converter operation. Through the braking its speed of rotation is reduced and roller sector 15b of the potentiometer 15 returns to the lower end, full voltage position. Owing to this the reference voltage for the exciting current increases again and at the basic speed the latter reaches its maximum value, which is maintained to standstill of the motor and resumption of speed to the basic speed in the opposite direction.

Thereupon the described regulation of the exciting current in the field weakening range is repeated, now with opposite direction of rotation.

In Fig. 2 still another device is provided, which at sudden sharp speed variations causes an additional field weakening. Thereby still another safety device against "sticking" of the regulation is produced. As it is desirable to operate in the field weakening range with the full armature voltage as far as possible in order to achieve a good efficiency factor of the armature rectifier, the potentiometer 15 will, as has been said, be so adjusted that it begins to reduce its output reference voltage at a speed of rotation which is as close as possible to the normal basic speed. In order reliably to avoid a "sticking" even under an unfavorable combination of mains voltage fluctuations and required accelerations of the motor, for large differences between reference and motor speed voltages for the armature current regulation 15 a higher speed is temporarily simulated than actually exists. For this purpose an overload relay 20 is provided which connects an additional voltage source 21 into the circuit of the actuating coil 15c when the difference between reference and motor speed voltages for the armature current regulation exceeds a predetermined value. Big differences between reference and motor speed voltages always occur when through the reference voltage setting means 13 a rapid variation of its speed is pre-given to the motor. The speed increase simulated by connection of the voltage source 21 causes a correspondingly earlier reduction of the exciting current and hence an additional acceleration of the motor, by which a "sticking" of the regulation is reliably prevented even at rapid speed variations.

Instead of the connection of a special voltage source 21, it may sometimes be sufficient to shortcircuit a series resistance of the actuating coil 15c or a part thereof. In this case, an alternating current machine may serve as tachometer dynamo in conjunction with a rolling sector regulator for alternating current. The rectifying cell 16 can then be omitted.

An additional field weakening can also be effected, for example, by a magnetic amplifier whose input side is connected to the difference between the reference and motor speed voltages for the armature current regulation and whose output voltage is inserted in the circuit of the actuating coil 15c, so that it supplies to the latter an additional voltage depending on the difference between the reference and motor speed voltages and simulating a speed increase. For this purpose the magnetic amplifier is advantageously arranged in known manner so as to furnish no or only a very low output voltage at small differences between the reference and motor speed voltages which, however, increases rapidly when the difference between the reference and motor speed voltages exceeds a certain threshold value and strives to reach an approximately constant final value.

The magnetic amplifier may be so arranged that the additional field weakening is dependent within a certain range on the magnitude of the difference between the reference and motor speed voltages, in particular, is proportional to it. Owing to this a "sticking" of the speed of rotation at some intermediate value in the field weakening range is reliably avoided even at abnormally great voltage decreases.

The use of a magnetic amplifier for the additional field weakening in this manner results in the advantage that no relay contacts are required therefor. Fig. 6 illustrates such a magnetic amplifier having an input winding 35 which is energized by the difference between the reference and motor speed voltages. This input circuit also includes a choke 36. The output winding 38 is connected in series circuit with a source of alternating voltage 41 and applied to a rectifier 39. The output of rectifier 39 is applied to a load resistor 40 and connected in the circuit between rectifier 16 and the control winding 15c of the roller sector type potentiometer 15 to supply the additional control voltage referred to above. The magnetic amplifier may also include an auxiliary biasing winding 37 which can be energized by a constant direct current.

Fig. 7 illustrates a typical variation of output current $i_2$ of the magnetic amplifier in dependence upon the input current $i_1$. The solid line shows the current characteristic when biasing winding 37 is not energized, and the output current $i_2$ is independent of the direction of the input current $i_1$. If a constant direct current flows through winding 37, the current characteristic follows the dashed line curve.

Instead of a rolling sector type potentiometer 15, there may be used, for example, a magnetic amplifier, preferably a saturation angle controlling magnetic amplifier. In Fig. 3 the parts essential for the explanation of an arrangement of this kind according to the invention are represented by way of example. Insofar as the same parts are contained therein as in Fig. 2, they have the same reference symbols as there.

The magnetic amplifier fed from an alternating current source 23 is denoted 22. It contains the working windings 22a, which through rectifier valves 22b and a feedback winding 22c are connected with the resistance 24 serving as load on the output circuit.

The voltage at this resistance is connected in opposition to the voltage of a constant direct current source 25 and together with the latter serves as the reference voltage for the regulation of the exciting current by means of the control device 10 of the exciting current rectifier. As a measure of the actual value of the exciting current there serves the voltage at resistance 26 which carries the output current of the transformer rectifier 19, the input to which is constituted by the alternating voltage obtained at the device 17 which is proportional to the current in the exciter circuit of the motor.

The tachometer dynamo 12 is connected through the rectifying cell 16 and a counter-voltage source 27 to the control winding 22d of the magnet amplifier. A current in this control winding, however, can flow only when the rectified voltage of the tachometer dynamo is greater than the voltage of the current source 27. When this is the case, such a current causes the formation of a correspondingly amplified current in the resistance 24 and hence, from what has been said before, a reduction of the exciting current.

If the voltage source 27 is so selected that the reduction of the exciting current just starts when the speed of rotation of the tachometer dynamo and hence also of the drive motor, not shown here, has approximately reached the basic speed, the arrangement operates similarly as the previously described rolling sector type potentiometer. The characteristic curve of the magnetic amplifier, which is selectable or variable in a fairly wide range, can then be so placed that also the required functional dependence of the exciting current on the speed of rotation (Fig. 1) results with sufficient accuracy.

A temporary additional field weakening can be achieved in the last-described arrangement for producing the reference voltage for regulating the exciter current in the same manner as used for the rolling sector type potentiometer device 15.

It is possible also, however, for the attainment of an additional field weakening to allow the difference between the reference and motor speed voltages for the armature current regulation to operate on another control winding 22e of the magnetic amplifier through a rectifying cell 28. By a current in winding 22e a speed increase is then simulated in the exciting current regulation in a similar manner as described before.

In order to achieve that then the additional field weakening becomes operatively only above a certain magnitude of the difference between reference and actual value, a threshold value former may be correlated to the winding 22d, consisting for example, of a countervoltage source 29.

If the rectifying cell 28 is composed, for example, of selenium rectifiers, which are known to let current pass practically only above a certain value of the connected voltage, that is, which by themselves function as threshold value formers, the countervoltage source 29 may be omitted. If desired, to increase the threshold value, additional selenium cells may be so connected in the circuit of winding 22e that their passing direction coincides with that of the rectifying cell 28.

For the limitation of the additional field weakening there may further be provided another selenium cell 30 which is connected in parallel with the winding 22e. At voltages above the threshold value voltage of this selenium cell it absorbs the greater part of the current proportional to the difference between theoretical and actual value and thereby prevents a major increase of the current flowing through winding 22e.

By suitable selection of the number of plates of this cell and corresponding selection of the series resistance 31 it can be achieved that the additional field weakening becomes operative within certain limits. Within these limits it can be proportional to the difference between the reference and motor speed voltages for the armature current regulation.

In Fig. 4 is shown a somewhat different arrangement for the use of a magnetic amplifier as a source of the reference voltage for control of the exciter current. Insofar as the same parts are contained therein as in Fig. 3, they are again denoted in the same manner.

In this arrangement it is assumed that the magnetic amplifier is a saturation angle controlling amplifier where, as is known, only a control current flowing in a certain direction produces a current in the output circuit.

The auxiliary control winding 22e is here connected to a direct current source 32 in such manner that, by the current produced by it, the magnetic amplifier is premagnetized in the blocking direction. The control winding 22d fed by the tachometer dynamo 12 and magnetizing in the opposite direction can, therefore, produce a current in the output circuit of the amplifier, i. e. in the resistance 24, only when its circulation becomes greater than that of winding 22e, which at suitable tuning will be the case when the motor has approximately reached the basic speed. The premagnetization by winding 22e thus has the same effect as the countervoltage of source 27 in Fig. 3.

The premagnetization operative in the blocking direction can, according to the invention, be used at the same time to carry out an additional field weakening. For this purpose a resistance 34 is connected in the circuit of winding 22e by an overload relay 33 dependent on the difference between the reference and motor speed voltages. The premagnetization caused by this winding is thereby weakened and the premagnetization originating from the tachometer dynamo 12 becomes correspondingly more effective. Thus, similarly as with the previously described devices, an increase in the motor speed is simulated in the regulating device for the exciter current supplied to motor field winding 8.

The invention is not limited to the examples shown but is capable of various modifications.

For example, the illustrated embodiment of Fig. 2 for effecting a movement of the roller sector of the potentiometer for supplying the reference voltage for the exciter current control may be replaced with a mechanical control of the roller sector taken directly from the motor speed. Such a device is illustrated in Fig. 5 wherein it will be seen that the pendulum 34 of a ball type centrifugal governor driven by the motor armature 4 is mechanically coupled to the roller sector 15b' of the potentiometer 15' and functions to move the sector 15b' when the basic motor speed is reached so as to lessen the reference voltage for the exciter current control taken off the potentiometer resistance 15a'.

The described regulating devices resulted according to their nature in static characteristic curves. By insertion of amplifiers of any kind the characteristic curves can be influenced in known manner so as to result in almost nonstatic regulations. If for this purpose current-controlling magnet amplifiers are used, they can, with a suitable design, serve at the same time, if desired, as rectifying cells for which otherwise dry rectifiers or any other rectifiers can be used.

Further, if it has previously been assumed that the armature current of the motor is controlled by a regulating device based on comparison between reference and motor speed values such as voltages, this is by no means a condition for the applicability of the invention. The inventive idea is applicable also, for example, when the control impulses of the rectifier for the armature current are adjusted, not by a regulating device, but directly by a control element, for instance by a potentiometer actuating a control lever, or by a rotary regulator.

Also drives where the motor armature is reversed, rather than repoling the exciting field for a reversal of the direction of rotation or for change-over to braking, permit the application of the invention. Such an arrangement is illustrated in Fig. 8 which is similar to the arrangement shown in Fig. 2 but has only one rectifier 6' to supply exciter current in one direction only to the motor field winding 8. Consequently, when the motor is reversed, it is necessary to reverse the direction of current flow through the armature 4 and this is accomplished by means of a reversing switch 41 in the armature circuit controlled by the polarized relay 14' which corresponds to relay 14 in the Fig. 2 circuit.

The invention is applicable also when the exciting current of the motor is controlled by yet another regulating device. For example, arrangements for feeding direct current drives of the kind here in question have been proposed where regulating devices based on comparison between theoretical and actual value for the armature current as well as for the exciting current are controlled by a common guide magnitude. In these exciting current is not constant within the basic speed range but is continuously regulated dependent on the mentioned guide magnitude. An arrangement according to the invention can be superimposed on such a regulation in that it serves as a limiting device. It then affects the aforesaid regulation only insofar as it prevents the exciting current of the motor from exceeding the values determined by the characteristic curves of Fig. 1.

Then also various modifications with respect to details of the represented models are possible. For example, the reversal of the direction of the exciting current to be regulated (contact 18 in Fig. 2), which depends on the sign of the difference between theoretical and actual value for the armature current regulation, may be carried out by an element other than a polarized relay and may be carried out at the resetting device instead of at the control device, and so forth.

For example, as shown in Fig. 9 the switching from rectifier 6" to rectifier 7" or vice versa by regulator 10" when the sense of the difference between the reference voltage at 13 and motor speed voltage at 12 changes is not effected abruptly by relay contacts as at 18 in Fig. 2 but rather by means of a magnetic amplifier 42 the output of which is applied to the regulator 10" and the input of which depends on the sense of the difference between the reference and motor speed voltages. Magnetic amplifier 42 is similar in construction to the magnetic amplifier shown in Fig. 6, the output including a source 43 of alternating voltage and being connected to the input of rectifier 44. The output from rectifier 44 is applied to a potentiometer 45 and the voltage from the latter is fed to the regulator 10" to effect the switching at rectifiers 6", 7".

I claim:

1. In a control arrangement for regulating a direct current dynamo-electric machine having armature and field elements, the combination comprising means providing a first reference quantity of adjustable magnitude, means providing a second quantity proportional to the speed of said machine, means responsive to the difference between said quantities for controlling the current in the armature element of said machine, means providing a third reference quantity of adjustable magnitude, means providing a fourth quantity proportional to the amplitude of the exciter current for the field element of said machine, means responsive to the difference between said third and fourth quantities for controlling said exciter current and means adjusting said third reference quantity in a sense to decrease the same in accordance with an increase in speed of said armature element.

2. A control arrangement as defined in claim 1 wherein last said means is arranged to effect a progressive decrease in said third reference quantity after said armature reaches a predetermined basic speed.

3. A control arrangement as defined in claim 2 wherein the progressive decrease in said third reference quantity has a hyperbolic characteristic.

4. A control arrangement as defined in claim 1 wherein said third reference quantity is constituted by the voltage output of a roller sector type potentiometer, said second quantity is constituted by the voltage output of a tachometer generator driven by said armature element, and said tachometer generator output is applied to the control winding of said potentiometer which actuates the roller sector thereof.

5. A control arrangement as defined in claim 4 and which further includes means for increasing the voltage applied to the control winding of said potentiometer when a predetermined large difference is reached between said first and second quantities.

6. A control arrangement as defined in claim 1 wherein said third reference quantity is constituted by the voltage output of a roller sector type potentiometer and said roller sector is actuated by a device having an output variable with the speed of said armature element.

7. A control arrangement as defined in claim 6 wherein said device whose output varies with armature speed is constituted by a centrifugal governor.

8. A control arrangement as defined in claim 1 wherein said third reference quantity is constituted by the output of a magnetic amplifier, and means controlling the input to said magnetic amplifier in accordance with the amplitude of said second quantity, said amplifier producing an output only for inputs which exceed a predetermined threshold value.

9. A control arrangement as defined in claim 8 wherein said magnetic amplifier is of the saturation angle controlled type, and further including a source of direct current connected to a saturation controlling winding on said amplifier.

10. A control arrangement as defined in claim 8 and which further includes means for effecting a supplementary increase in the input when a predetermined large difference is reached between said first and second quantities.

11. A control arrangement as defined in claim 1 and which further includes means responsive to a predetermined large difference between said first and second quantities for effecting an apparent increase in armature speed thereby to more quickly effect a reduction in said third reference quantity.

No references cited.